United States Patent Office 3,298,487
Patented Jan. 17, 1967

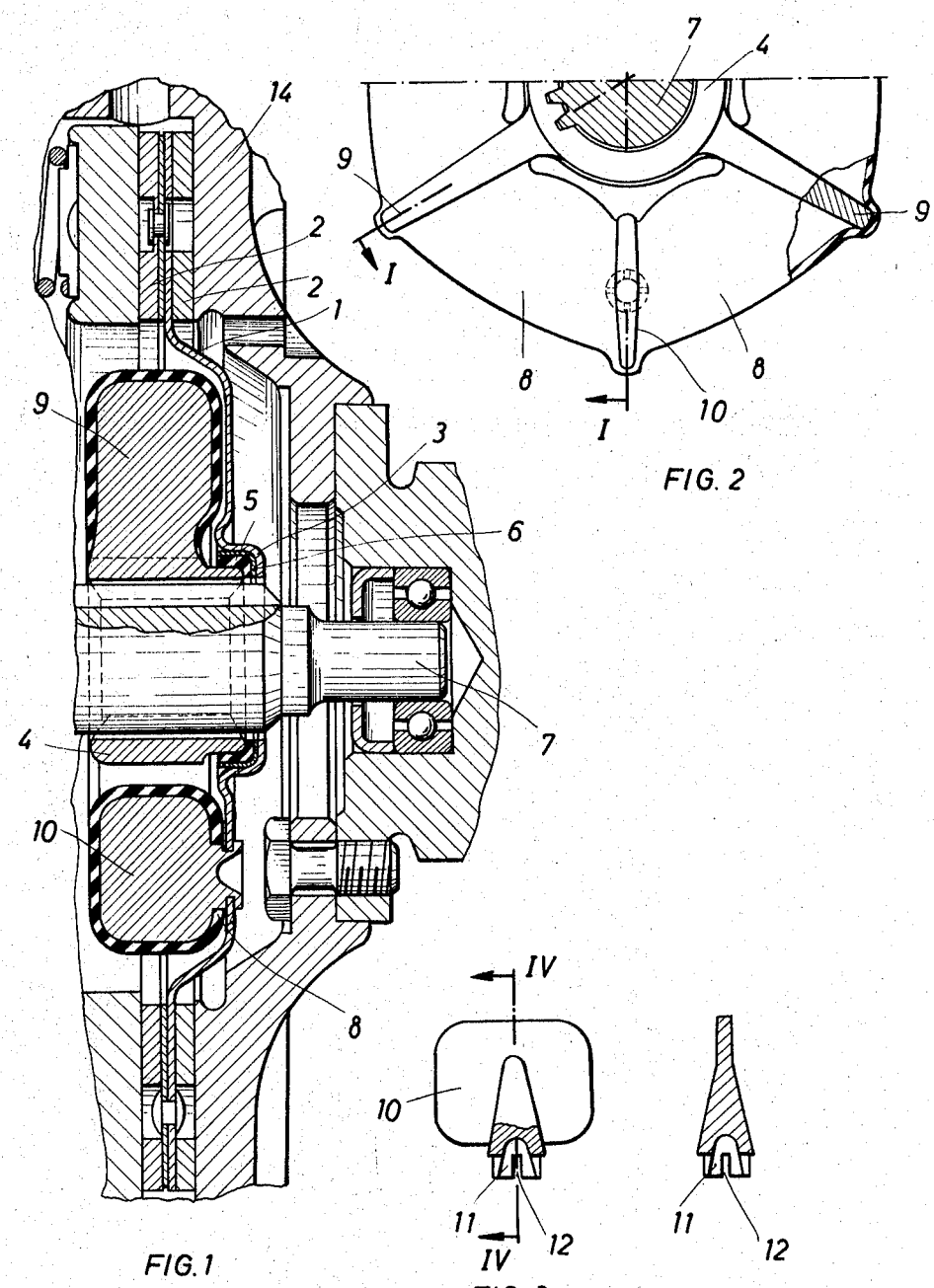
Inventors
Hans DEURING & Hans-Joachim TOLKSDORF

3,298,487
SHOCK ABSORBER AND PARTICULARLY
FOR USE WITH CLUTCH
Hans-Joachim Tolksdorf, Opladen, and Hans Deuring, Burscheid, Cologne, Germany, assignors to Goetzewerke Friedrich Goetze Aktiengesellschaft, Dusseldorf, Germany
Filed May 18, 1965, Ser. No. 456,722
Claims priority, application Germany, June 5, 1964, G 40,765
7 Claims. (Cl. 192—52)

This invention relates to a shock absorber for use in transmitting torque or disc type clutches on motor vehicles.

The prior art transmission of motor vehicles which are driven by internal combustion engines do include an elastic connection between the engine and the transmission which connection is designed for shock absorption.

In one of these prior art constructions, the coupling hub and coupling disc of the clutch member are separated from each other and are connected through the use of tangentially positioned coiled springs so as to insure an elastic or resilient transmission of the driving torque. By suitable positioning of the springs, a progressively broken characteristic curve is obtained in which the spring tension is increased at the beginning and at the end of the curve. By controlling the surface friction of the individual discs, it is possible to achieve a certain shock absorbing effect which naturally requires certain forces to overcome the static friction for breaking loose.

It is also old to provide an elastic element in the form of two built-in half shells and to fasten the housing thus constructed to the disc that carries the clutch lining. The hub bushing with its radial flange then extends approximately symmetrically into the elastic element with the half shells and the hub sleeve vulcanized to the elastic element. Rotary swinging shock absorbers of this kind have only a small torsion angle and require additional turning moment safety. In the same manner axial displacements can be compensated.

In the present invention, there is a rotatable member which has an elastic or resilient member thereon and which also has a hub portion. The resilient member which is ring-like in shape has a plurality of metal coupling elements embedded therein which are secured to the coupling disc. The coupling disc is generally disc-shaped in cross section and has a central portion which is rotatably mounted on the said hub portion. In a preferred embodiment, a resilient hub sleeve is positioned between the hub portion and the central portion of the coupling disc. The metal coupling elements mentioned above are then connected to the coupling disc to provide the resilient connection. It is especially important that the coupling disc is rotatably mounted on the hub portion so as to provide a shock free rotation of the clutch disc relative to the hub portion.

Accordingly, a primary object of this invention is to provide a resilient driving connection between the driving and driven elements in a disc type clutch which has long life.

Another object is to provide a rotary type shock absorber for disc type clutches which is compact and which can be built into the clutch between the friction linings of the disc and the hub of the driven member.

Another object is to provide a resilient driving connection between the driving and driven elements in a disc type clutch which permits a relatively large torsion angle to prevent failure of the driving connection.

These and other objects and advantages will be more readily understood in connection with the following description and drawings, in which:

FIGURE 1 is a cross section through the clutch taken along the lines I—I of FIGURE 2;

FIGURE 2 is a partial side view of the shock absorber of this invention looking from the left side of FIGURE 1;

FIGURE 3 is a side view of metal element embedded in the shock absorber and adapted to be secured to the coupling disc of the clutch, and FIGURE 4 is a cross sectional view taken along the lines IV—IV of FIGURE 3.

Referring to the drawings in more detail, FIGURE 1 shows the general construction of the shock absorber of this invention as seen in cross section. There is included a coupling disc means 1 with the friction linings 2 secured to the outer periphery thereof as shown. A thin metal plate is used to facilitate the fastening of the clutch facings 2 to the clutch disc means 1.

The clutch disc means 1 is generally disc-shaped in cross section and has a cup-shaped portion 3 as shown. The cup shaped portion 3 may be rotatably mounted on the hub portion 4 of the rotatable member in one embodiment, or as in the preferred embodiment, an elastic or resilient sleeve member 5 is positioned between hub 4 and cup portion 3 as shown. The surface of the sleeve member 5 which comes in contact with cup portion 3 may be provided with known frictionless material 6, or a material which is adapted to receive a lubricant.

The hub portion 4 is splined to the shaft 7 to rotate therewith and yet permit the hub portion 4 to be axially slidable thereon. There are 3 radial type lugs, arms, or elements 9 which are secured to the hub portion 4 and which are equally spaced therearound with two of the arms being shown in FIGURE 2.

The elastic or resilient member 8 may be made of rubber, for example, and is ring shaped and is vulcanized to the radial arms and hub portion as shown in FIGURES 1 and 2.

To secure the resilient member 8 to the clutch disc means 1, there are provided metal fasteners which are imbedded and vulcanized in the resilient member 8. These fasteners, or elements, have a generally flat portion 10 with an extended portion 11 having slots 12 therein as shown in FIGURES 3 and 4. The clutch disc means is suitably apertured to receive the portions 11 of the fasteners to position them along radial lines between the lugs or arms 9 as shown in FIGURES 1 and 2.

After the portions 11 of the fasteners are inserted through the pertaining holes in the clutch disc means 1, the member 8 is tensioned and the portions 11 are bent over or riveted to the clutch disc means to form a permanent driving connection between the cup portion 3 and the hub portion.

The resilient member 8 permits a relatively large torsion angle of about 50° to prevent breakage of the driving connection. As stated earlier, the hub portion 4 is axially adjustable on shaft 7 by a known splined connection. The other member may be a flywheel member such as 14.

It should be noted that the clutch disc means 1 is rotatably supported on the hub portion 4 via sleeve member 5 to provide for shock free rotation of the clutch disc means relative to the hub sleeve without permitting the resilient member to exert a negative effect. Instead of the frictionless layer on sleeve member 5, a ball or roller bearing means may be inserted between the contacting surfaces.

The clutch disc means 1 is cup shaped as shown in FIGURE 1, for receiving the shock absorbing member 8 to an extent which is equal to at least half the axial thickness of member 8 so that the periphery of the clutch disc means lies in a plane which passes through about the center of resilient member 8.

The flow of power between the two rotary members to be interconnected by the clutch with the torsionally resilient element can be in either direction and the same shock absorbing characteristics will be obtained.

It will be understood that this invention is susceptible to modification in order to adapt it to different usages and conditions; and accordingly, it is desired to comprehend such modifications within this invention as may fall within the scope of the appended claims.

What is claimed is:

1. In a clutch arrangement for effecting driving connection between a pair of members; one of said members being an input member and the other of said members being an output member, a rotating member having a hub means fixed to rotate with said input member and axially slidable thereon, clutch disc means having clutch facing means thereon for operative engagement with said output member and also having a central portion, resilient sleeve means on said hub, said rotating member having resilient means thereon, and means operatively connecting said resilient means with said clutch disc means, said central portion of said clutch disc means radially and axially engaging said sleeve means and adapted for limited rotation thereon, said means operatively connecting said resilient means with said clutch disc means comprising; metal elements imbedded in said resilient means and having portions extending therefrom and secured to said clutch disc means.

2. The arrangement as claimed in claim 1 in which said clutch disc means is secured to said resilient means so as to bias said central portion axially against said resilient sleeve means.

3. The arrangement as claimed in claim 2 in which said clutch disc means is generally disc-shaped in cross section and at least partially receives said rotataing member therein.

4. The arrangement as claimed in claim 3 in which said clutch disc means has an outer portion to which said clutch facing means are secured, said outer portion lying in a plane passing through approximately the center of said resilient means on said rotating member as measured in an axial direction.

5. In a clutch arrangement for effective driving connection between a pair of members; one of said members being an input member and the other of said members being an output member, a rotating member having a hub means fixed to rotate with said one member and axially slidable thereon, clutch disc means having means thereon for operative engagement with the other said member, circumferentially spaced blade-like elements on said hub means projecting radially outwardly therefrom, blade-like elements on said clutch means projecting axially therefrom into the space between the said elements on said hub means, and a substantially tubular annulus of resilient material extending around said hub means and enclosing the projecting portion of said elements and operatively connecting said rotary member with said clutch disc means, said clutch disc means operatively abutting against one end of said hub means and being adapted for a limited rotation on said hub means.

6. In a clutch arrangement according to claim 5, in which friction reducing means is mounted on said one end of said hub means and is engaged by said clutch disc means.

7. In a clutch arrangement for effecting driving connection between a pair of members; one of said members being an input member and the other of said members being an output member, a driven output shaft, a rotating member having a hub fixed to rotate with one of said members and axially slidable thereon, a substantially tubular annulus of resilient material coaxially surrounding said hub of said rotating member and adapted to provide a resilient driving connection between said one member and the other of said members, clutch disc means coaxial with said hub having clutch facing means on the periphery thereof for operative engagement with said other member and rotatably mounted on said hub, circumferentially spaced blade-like elements in said tubular annulus fixed thereto in planes extending substantially radially of said hub, alternate ones of said elements being fixed to said hub and the others thereof being fixed to said clutch disc means, the circumferential spacing between adjacent ones of said elements being such that a torsion angle of substantially 50° is provided between said pair of members.

References Cited by the Examiner

UNITED STATES PATENTS

| | | | |
|---|---|---|---|
| 2,708,352 | 5/1955 | Boschi | 64—14 |
| 3,112,626 | 12/1963 | Barone | 64—11 |
| 3,148,756 | 9/1964 | Romanini | 192—107 |
| 3,238,742 | 3/1966 | Martorana | 64—11 |

DAVID J. WILLIAMOWSKY, *Primary Examiner.*

A. T. McKEON, *Assistant Examiner.*